United States Patent Office 3,210,825
Patented Oct. 12, 1965

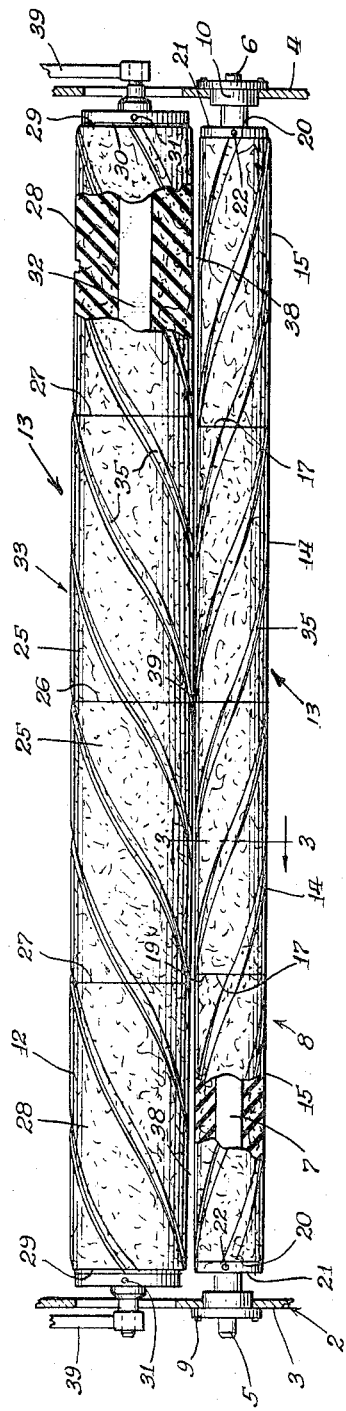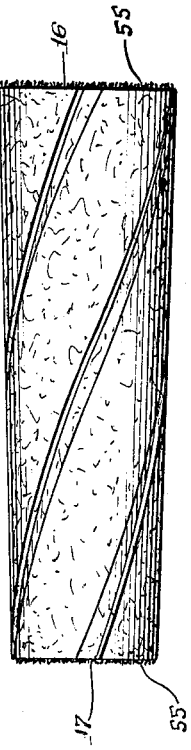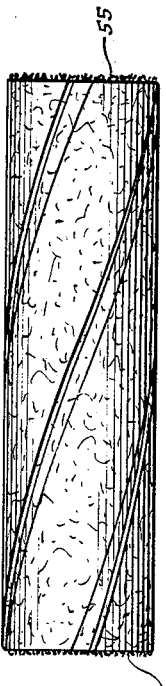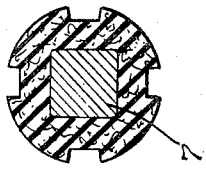
Inventor:
Edward J. Johnston
John J. Kowalik
Atty.

3,210,825
HAY CRUSHING ROLLS HAVING LONG SUB-
STANTIALLY CYLINDRICAL SECTIONS
Edward J. Johnston, La Grange Park, Ill., assignor to
International Harvester Company, Chicago, Ill., a
corporation of New Jersey
Filed Oct. 14, 1963, Ser. No. 315,869
6 Claims. (Cl. 29—121)

This invention relates to hay crushing mechanisms and more specifically to a novel construction of the crushing rolls therefor and is a continuation-in-part of U.S. application 48,430 filed August 9, 1960, now abandoned.

There is now being marketed a highly successful hay conditioner or crusher which comprises a pair of crushing rolls which are made up of laminations of tire carcass material. Although this has proved to be an eminently successful machine, the production of the crushing rolls has proved to be extremely troublesome and costly in that since the tire carcass is from used tires, the availability as well as the quality of the material cannot be readily controlled and thus requires constant inspection from purchase up to the final product and even under such circumstances occasionally faulty material will be found in the rolls after they have been used only in a few hours of service. A further complication arises in the manufacture of such laminated tire carcass rolls in that extreme care must be exercised in properly and tightly compacting the disks so as to prevent the occurrence of voids between the disks where the material is subjected to excessive flexing and is caused to quickly burn out.

It is with these problems in mind that various attempts have been made to provide a solution in the availability of the material, its uniform quality and in its facility for assembly.

A general object of the invention is to provide a novel hay crushing roller which obviates all of the foregoing disadvantages of the tire carcass disk rolls and wherein a high quality and good performance roll is obtained.

The invention contemplates the provision of tubular or cylindrical molded fiber impregnated sections which have helical grooves molded in the periphery thereof and which are provided with a central non-round opening adapted to sleeve over a complementary center shaft for interlocking the section with the shaft.

A further object of the invention is to provide a novel roll which incorporates relatively few sections which are butted end to end and sleeved onto a shaft and so interfitting with one another as to preclude the necessity for exerting extremely high axial pressures against the segments in order to compact them together.

The invention contemplates the provision of a plurality of elongated substantially cylindrical sections which are made of fiber impregnated elastomer material of between 85 and 95 durometer in order to provide surface conditions which readily shed moisture and prevent the clinging of film of liquid or plant excretions such as tend to cause the material such as hay to adhere to the rolls and wrap around the rolls.

These and other objects and advantages inherent in and encompassed in the invention will become more readily apparent from the specification and the drawings wherein:

FIGURE 1 is a side elevational view of a pair of crushing rolls partially in axial section shown in association with an ambulatory hay crusher fragmentarily shown;

FIGURE 2 is a side elevational view of a frusto-conical section of one of the rolls;

FIGURE 3 is a cross-sectional view taken substantially on the line 3—3 of FIGURE 1 on an enlarged scale; and FIGURE 4 is a further side elevational view of a cylindrical section comparable to FIGURE 2.

Describing the invention in detail and having particular reference to the drawings, there is shown an ambulatory carrier 2 of the hay crushing unit which comprises a pair of side supports 3 and 4 respectively supporting opposite ends 5 and 6 of a center shaft 7 of a roller generally designated 8 by means of bearings 9 and 10 which are suitably mounted on said members 3 and 4. The roller 8 is positioned substantially horizontally and is adapted to move in close proximity to the ground in sweeping relation to a stubble of hay in a field over which the machine is being operated. The roller 8 is beneath and engaged by an upper roller 12 which is of substantially the same construction as the lower roller except for the fact that it is slightly longer and of larger diameter.

It will be understood that each roller comprises a body of elastomer material generally designated 13 which is composed of several tubular or axially elongated molded segments or sections 14, 14 and 15, 15, the sections 14, 14 being the center sections and the sections 15, 15 being the outer sections. It will be seen that in this embodiment the sections are each substantially in the form of a truncated cone and taper slightly from their innermost ends 16 to their outermost ends 17 and collectively define a crowned or a tapered roll which is of maximum diameter at the center of the roll and of minimum diameter at the ends of the roll. It will be seen that the center sections 14 abut each other at their ends 16 along substantially flat radial faces and that the outer ends 17 of the center rolls abut the inner ends 19 of the outer sections and that the outer ends 20 of the end sections are engaged by end caps 21 which are suitably fastened as by pins 22 to the shaft 7. It will be understood that the sections 14 and 15 are compacted axially for an axial pressure which is of such magnitude as will abut the adjacent or engaging ends together so that the parting lines between the same are practically eliminated.

Similarly the upper roll is comprised of a plurality of sections including a pair of center sections 25, 25 which abut each other along radial faces at 26 at their inner ends and the outer ends abut as at 27, 27 against the inner ends of the outer sections 28, 28 which at their outer ends 29 are engaged by the end caps 30, 30 which are suitably secured as by pins 31 to the center shaft 32 of the upper roll, said center shaft 32 being preferably of square section at the body portion 33 of the roll as it is constituted by the sections 25 and 28 and interlocked with said sections so that the same rotate in unison. It will also be noted that these blocks of elastomer material are made with interspersed fiber and that all of the segments are of between 85 and 95 durometer. Each of the upper and lower segments are provided with four helical grooves 35 which are preferably spaced 90° apart so that the circumferential disposition of each block or section on its respective roll is not particularly material. It will be seen that the upper segments 25 as well as the segments 28 taper from their inner to their outer ends.

As best seen in FIGURE 1, the rolls therein shown are under slight engagement but in operation they are under considerable pressure as to close the gaps 38, 38 at opposite sides of the center 39 of the rolls, the taper being so chosen as to provide substantially uniform pressure from end to end of the rolls as the shafts deflect outwardly pursuant to loading of the mechanisms represent at 39, 39 which are adapted to load the upper roll against the lower roll.

It has been found through actual practice that the construction herein described provides not only a reduction in manufacturing costs over previous designs because of the lesser number of pieces to be handled, but also because of the reduction in the number of separations or parting lines so that to obtain an adequate compaction a relatively low axial pressure is required as compared with the amount required when the crushing rolls are manufactured of tire carcass disks.

Furthermore, in view of this low axial pressure it is conceivable that these rolls may be readily taken apart and assembled in the field by the farmer who needs only to provide himself with a replacement for the section which is defective. In the present instance the illustration is applied to a 7 foot wide conditioner and it will be readily understood that the four sections are of substantially equal length. This large extent of the roll section permits the insertion of new sections with the remaining older sections and even though the diameter of the new section will undoubtedly be slightly larger than the other used sections its contact with the opposing roll secion being over a broad area will not obtain highly localized high pressure areas with attendant development of frictional heat and excessive wear. In such instances the user would normally run in the new section and since the area of contact would be limited only or substantially to the length of the new section the same would quickly abrade and wear down to a point where it would conform to the contour of the section that it had replaced.

It will be understood that by segmenting the roll as herein disclosed that a practical approach has been realized in obtaining a molded roller wherein the molds are of reasonable length so as to obtain the high degree of control in their equality and in the molding of the helical grooves as well as the square center aperture which admits the center shaft therethrough.

FIGURE 4 is illustrative of a cylindrical section, however for purposes of this application inasmuch as the taper of the other sections is minimal the expression "substantially cylindrical" is believed to generically describe either construction. The roll section 50 in FIGURE 4 of course may be placed in any position on either shaft where the two rollers are cylindrical.

It has been also found that these sections must be made of a durometer of between 85 and 95 and that in making these sections of a lower durometer the elastomer material has a tendency to cause film of plant juices or water to adhere to the surface under a hypertension which refuses to shed and actually causes the hay and other material to cling to the rollers and wrap around the rollers quickly making the machine ineffective and wrapping the same.

In each embodiment as heretofore disclosed the fibers identified 55, extend axially outwardly of the ends of each roller segment. These fibers on the abutting ends of contiguous roller segments intermesh with each other and provide in conjunction with the deflection on the ends of the opposing segment, a mechanical interlock between the segments which prevents the segments from working relative to each other in radial as well as circumferential deflection. Such deflection causes friction heat to develop and quickly destroys the rubber. Thus the segments being mechanically interlocked work as a unitary structure.

What is claimed is:

1. A hay conditioning roll having a center shaft, a plurality of elongated molded roll segments mounted upon the shaft in end to end relation and forming a roll body, means on the shaft and segment interlocking the same against relative rotation, each segment composed of elastomer material of relatively high durometer and having a surface condition characterized by the ability to shed fluids tending to adhere thereto incidental to crushing hay crops and the like thereagainst, said sections being of elastomer material with fibers therein projecting axially of the sections beyond the ends said sections thereof, in assembled position on the shaft having the fibers beyond the ends of each section imbedded into the opposing section and under a relatively low compressive loading therebetween axially of the sections interlocking the sections with each other over the entire opposing faces of the sections.

2. The invention according to claim 1 and each segment being of between 85 and 95 durometer and of solid section.

3. The invention according to claim 1 and said fibers being disoriented and interspersed in said elastomer material and providing material catching tentacles at the periphery of the roll.

4. The invention according to claim 1 and said sections being of truncated conical form.

5. In a hay conditioning roller, a support shaft, a plurality of roller segments sleeved on the shaft, means holding said sections on the shaft under axial compression in end to end relation, each segment comprising elastomer material and fiber material within the elastomer material, the fiber material projecting from the elastomer material beyond the ends of the elastomer of the section and imbedded into the elastomer material of the contiguous section with the fibers projecting from the end of the contiguous section and interlocking therewith and preventing relative radial deflection between said sections and frictional sliding movement therebetween.

6. The invention according to claim 5 and each said section having a plurality of equally spaced spiral grooves, and the grooves of one section connecting with the grooves of adjacent sections, and each groove extending at least 180° about the section.

References Cited by the Examiner

UNITED STATES PATENTS

| | | | |
|---|---|---|---|
| 1,600,841 | 9/26 | Neall | 29—125 X |
| 1,628,835 | 5/27 | Furbush | 56—1 |
| 2,610,633 | 9/52 | Jozwik | 29—121 |
| 2,801,461 | 8/57 | Kusters | 29—120 |
| 2,921,426 | 1/60 | Heth. | |
| 3,054,163 | 9/62 | Lakin | 29—125 |
| 3,088,189 | 5/63 | Johnston | 29—125 |

WALTER A. SCHEEL, *Primary Examiner.*

LOUIS O. MAASSEL, *Examiner.*